3,689,443
THERMOPLASTICALLY PROCESSABLE POLYURETHANE ELASTOMERS
Walter Fensch, Hannover, Germany, assignor to BASF Wyandotte Corporation, Wyandotte, Mich.
No Drawing. Continuation of abandoned application Ser. No. 783,139, Dec. 11, 1968. This application Nov. 9, 1970, Ser. No. 88,128
Claims priority, application Germany, Dec. 13, 1967, P 17 20 544.6
Int. Cl. C08g 22/10
U.S. Cl. 260—18 TN                                    8 Claims

ABSTRACT OF THE DISCLOSURE

A polyurethane adapted to be processed thermoplastically into a product having a substantially permanent hardness of about Shore A 80° or less is provided by reacting a hydroxy polycaprolactone having a molecular weight of from about 1,500 to about 2,500, a hydroxy polycaprolactone having a molecular weight of from about 500 to about 600, a glycol having a molecular weight below about 250 and diphenylmethane-4,4'-diisocyanate.

---

This application is a continuation of Ser. No. 783,139, filed Dec. 11, 1968, and now abandoned.

This invention relates generally to polyurethanes and more particularly to an improved thermoplastically processable polyurethane.

It has been proposed heretofore to make thermoplastically processable polyurethanes by reacting high molecular weight polyols such as, for example, polyesters, poly(alkylene ether) glycols and chain extenders with an organic diisocyanate. In such a process, the reaction between the various components is interrupted after solidification but before it has proceeded to the point where the polyurethane can no longer be processed by conventional thermoplastic shaping methods. It is possible to prepare polyurethane elastomers ranging in hardness from very soft to very hard by selecting particular reactive components, by varying the ratios of such components or by making variations in the technique used to prepare the thermoplastic polyurethane. It has been found, however, that the soft elastomers having a hardness of Shore A 85° or less obtained by thermoplastic processing have the disadvantage of becoming harder in storage. In other words, the prior art soft polyurethane elastomers have the tendency of becoming harder even after relative short storage periods and, consequently, have not been entirely satisfactory for some purposes.

It is, therefore, an object of this invention to provide a thermoplastic polyurethane devoid of the foregoing disadvantages. Another object of this invention is to provide a process for making thermoplastically processable polyurethanes adapted to be shaped into polyurethane articles having a substantially permanent hardness of about Shore A 80° or less. Another object of this invention is to provide thermoplastically processed polyurethanes having a more stable hardness of Shore A 80° or less.

The foregoing objects and others are accomplished in accordance with this invention, generally speaking, by providing a thermoplastically processable substantially non-porous polyurethane prepared by a process wherein a substantially linear hydroxy polycaprolactone having a molecular weight of from about 1,500 to about 2,500 and a hydroxyl number of from about 75 to about 45, a hydroxy polycaprolactone having a molecular weight of from about 500 to about 600 and a hydroxyl number of from about 225 to about 187 and a glycol having a molecular weight below about 250 are reacted substantially simultaneously with diphenylmethane-4,4'-diisocyanate under conditions which produce a solid but remeltable and thermoplastically processable polyurethane. It has been found that a substantially non-porous polyurethane elastomer having a hardness below about Shore A 80° which will retain this hardness in storage can be produced by thermoplastic processing provided the foregoing reactants are used in the preparation of the thermoplastic polyurethane. The lower molecular weight polycaprolactone and the glycol act as combined chain extenders. Preferably, the glycol chain extender is 1,4 butane diol or phenylene bis(hydroxy alkyl ether) in which the alkyl group has from 2 to 10 carbon atoms. Best results are obtained with 1,4 butane diol so it is preferred. Phenylene bis($\beta$-hydroxy ethyl ether) is the preferred phenylene bis(hydroxy alkyl ether).

By substituting a polycaprolactone for the polyether or polyester heretofore used and by using the combination of the specified chain extenders, a polyurethane is obtained which will retain its hardness of Shore A 80° or less for an extended period of time.

Any polycaprolactone ester having two hydroxyl groups and a molecular weight between about 1,500 and about 2,500, preferably about 2,000, may be used in the process provided by this invention. Likewise, any polycaprolactone ester having two hydroxyl groups and a molecular weight between about 500 and about 600 may be used as one of the chain extenders. Such polycaprolactone esters can be prepared by polymerizing $\epsilon$-caprolactone together with a glycol, preferably di-ethylene glycol. Suitable hydroxy polycaprolactones are disclosed, for example, in U.S. Pat. 2,933,478.

In practicing the invention, the various components are mixed together by stirring or other means for agitating and effecting substantially uniform dispersion of one in the other. An apparatus similar to that disclosed in U.S. Re. 24,514 can be used for this purpose. The reactive components are stirred together until some reaction has occurred and the reaction mixture has increased in viscosity. Usually, the period of time for this reaction will be from about 1 to about 5 minutes. The partially reacted mixture is spread while it is still liquid over a heated surface in a relatively thin film and maintained at this temperature while chemical reaction continues to form a solid polyurethane. This solid polyurethane is cooled below a temperature where any further substantial chemical reaction will occur before the reaction has proceeded to the point where the polyurethane is no longer processable by thermoplastic methods such as, for example, by injection molding, compression molding, extrusion or the like. Usually, the time period on the heated surface will be from about 5 to about 15 minutes. It is preferred that the temperature of the heated surface be from about 110° C. to about 120° C. with the best results being obtained at about 115° C.

After the thermoplastic polyurethane has been removed from the heated surface, it is extruded and cut into lengths or otherwise granulated. It is advantageous to store the slab material for 24 or more hours before granulating. It is also advantageous to granulate the material again after 8 or 10 days to improve the transparency of the polyurethane and reduce the tendency to shrink.

Best results are obtained when the diphenylmethane-4,4'-diisocyanate is added to the reaction mixture as a solid, preferably as finely divided particles. In accordance with the invention, the components are reacted substantially simultaneously. In one of the embodiments of the invention, the two chain extenders are mixed together at about 25° C. to about 40° C. and mixed with the higher molecular weight hydroxy polycaprolactone while it has a temperature of from about 105° C. to about 150° C. After these hydroxyl bearing components have been mixed substantially uniformly together, the mixture is immediately mixed with the diphenylmethane-4,4'-diisocyanate while it is at a temperature of from about 80° C. to about 150° C.

Up to about 10% by weight castor oil can be included in the reaction mixture if desired without adversely affecting the transparency of the articles made therefrom. The castor oil will react with the diisocyanate and vary the properties of the resulting polyurethane.

The thermoplastic polyurethanes provided by this invention can be used to advantage in making flexible tubing, cable jackets and other similar articles made by extrusion.

The ratio of hydroxy polycaprolactone chain extender to glycol having a molecular weight of not more than about 250 can vary from about 0.1 mol to about 1.0 mol polycaprolactone per mol glycol. Best results are obtained when the —NCO to total —OH (i.e. —OH of both polycaprolactones plus —OH in the other chain extender) is from about 1.06 to 1.09 —NCO per —OH. Preferably, the ratio of —NCO to total chain extender (lower molecular weight polycaprolactone plus glycol) is from about 1.56 to 1.63 —NCO per —OH.

EXAMPLE I

About 1,000 parts by weight of a substantially linear hydroxyl polycaprolactone having a molecular weight of about 2,080 and a hydroxyl number of about 54 are mixed while substantially anhydrous at about 120° C. with about 131.5 parts by weight of a substantially linear, substantially anhydrous hydroxyl polycaprolactone, which has been heated to about 30° C., and having a molecular weight of about 534 and a hydroxyl number of about 210, and with 17 parts by weight of a hydrolysis inhibitor bis-(2,6-diisopropyl)phenylcarbodiimide.

About 70 parts by weight of 1,4 butane diol are then thoroughly stirred into this mixture after it has reached a temperature of 110° C., and after 30 seconds, about 400 parts by weight of ground diphenylmethane-4,4'-diisocyanate are stirred in. The temperature of the mixture drops from about 102° C. to about 82° C., but immediately rises again because of the heat developed by the exothermic reaction. After stirring for about 1.5 minutes, the material, which now has a temperature of about 102° C., is poured, while still liquid, on to preheated metal sheets and is left there for about 13 minutes. The liquid mixture slowly solidifies. The metal sheets have a temperature of about 115° C. and rest on a table heated to about 125° C.

Upon expiration of the 13 minutes period of dwell on the heated table, the fused slabs are first cooled to room temperature, then kept for 2 days in closed containers, protected against atmospheric humidity, and then granulated by extrusion and cutting; next, the granulate is stored for 8 days at room temperature and finally granulated again in an extruder.

The granules can then be shaped by thermoplastic processes to form polyurethane articles having a Shore A hardness of 75. They retain this hardness permanently and are transparent. The following table gives details of their other important properties.

| Test | DIN specification | Unit | Value |
|---|---|---|---|
| Density | 53550 | G./cm.³ | 1.15 |
| Tensile strength | 53504 | Kp./cm.² | 511 |
| 100% modulus | 53504 | Kp./cm.² | 30 |
| 300% modulus | 35504 | Kp./cm.² | 50 |
| Elongation | 53504 | Percent | 640 |
| Impact elasticity | 53512 | do | 43 |
| Extended tensile strength | 53507 | Kp./cm. | 33 |
|  | 53515 | Kp./cm. | 49 |
| Abrasion | 53516 | Mm.³ | 36 |
| Compression set, room temperature | 53517 | Percent | 17.4 |
| Compression set, 70° C | 53517 | do | 51.0 |

| Storage time in water, days | Temp., C° | Tensile strength, kp./cm. | Elongation, percent |
|---|---|---|---|
| 7 | +80 | 496 | 640 |
| 14 | +80 | 440 | 670 |

It is to be understood that any other reactive component or other processing condition disclosed as suitable herein can be used in the foregoing example instead of the particular ones set forth. It is also pointed out that variations can be made by those skilled in the art in practicing this invention without departing from the spirit and scope thereof.

I claim:

1. A thermoplastically processable polyurethane which upon thermoplastic processing produces a polyurethane having a permanent hardness of Shore A 80° or less and prepared by the process which comprises mixing a substantially linear hydroxy polycaprolactone having a molecular weight of from 1,500 to about 2,500, a substantially linear hydroxy polycaprolactone having a molecular weight of from about 500 to about 600, a glycol having a molecular weight of not more than about 250 and diphenylmethane-4,4'-diisocyanate, heating the resulting mixture until solidification of the mixture and interrupting chemical reaction by cooling the mixture before the resulting product is no longer processable by thermoplastic methods.

2. The product of claim 1 wherein the glycol is 1,4-butane diol.

3. The product of claim 1 wherein the ratio of isocyanato to total hydroxyl is from about 1.06 to 1.09 —NCO per —OH.

4. The product of claim 3 wherein the ratio of isocyanato to hydroxyl of the lower molecular weight polycaprolactone plus the hydroxyl of the glycol is from about 1.56 to 1.63 —NCO per —OH.

5. The product of claim 1 wherein up to about 10% by weight castor oil is included in the reaction mixture.

6. The product of claim 1 wherein the ratio of lower molecular weight polycaprolactone to glycol is from about 0.1 to about 1 mol of the former per mol of the latter.

7. The product of claim 2 wherein the polycaprolactones have a molecular weight of about 2080 and 534.

8. The product of claim 1 wherein the reaction mixture is spread as a film over a heated surface after mixing about 1 to about 5 minutes and while still liquid and is cooled below reaction temperature after the film has been heated at about 110° to about 120° C. for about 5 to about 15 minutes and has solidified but before the product is no longer processable by thermoplastic methods.

References Cited

UNITED STATES PATENTS

| | | | |
|---|---|---|---|
| 3,084,177 | 4/1963 | Hostettler et al. | 260—404.5 |
| 3,523,101 | 8/1970 | Reuter | 260—47 |
| 3,591,561 | 7/1971 | Kazama et al. | |

FOREIGN PATENTS 1,479,785  5/1967  France _____ 260—77.5 AN

DONALD E. CZAJA, Primary Examiner

H. S. COCKERAM, Assistant Examiner

U.S. Cl. X.R.

260—77.5 AN, 77.5 AA